Feb. 9, 1943. R. ESNAULT-PELTERIE 2,310,520
HEATING AND REFRIGERATING PROCESS AND APPARATUS
Filed Oct. 9, 1939 5 Sheets-Sheet 1

INVENTOR
Robert Esnault-Pelterie
BY
Kenyon & Kenyon
ATTORNEYS

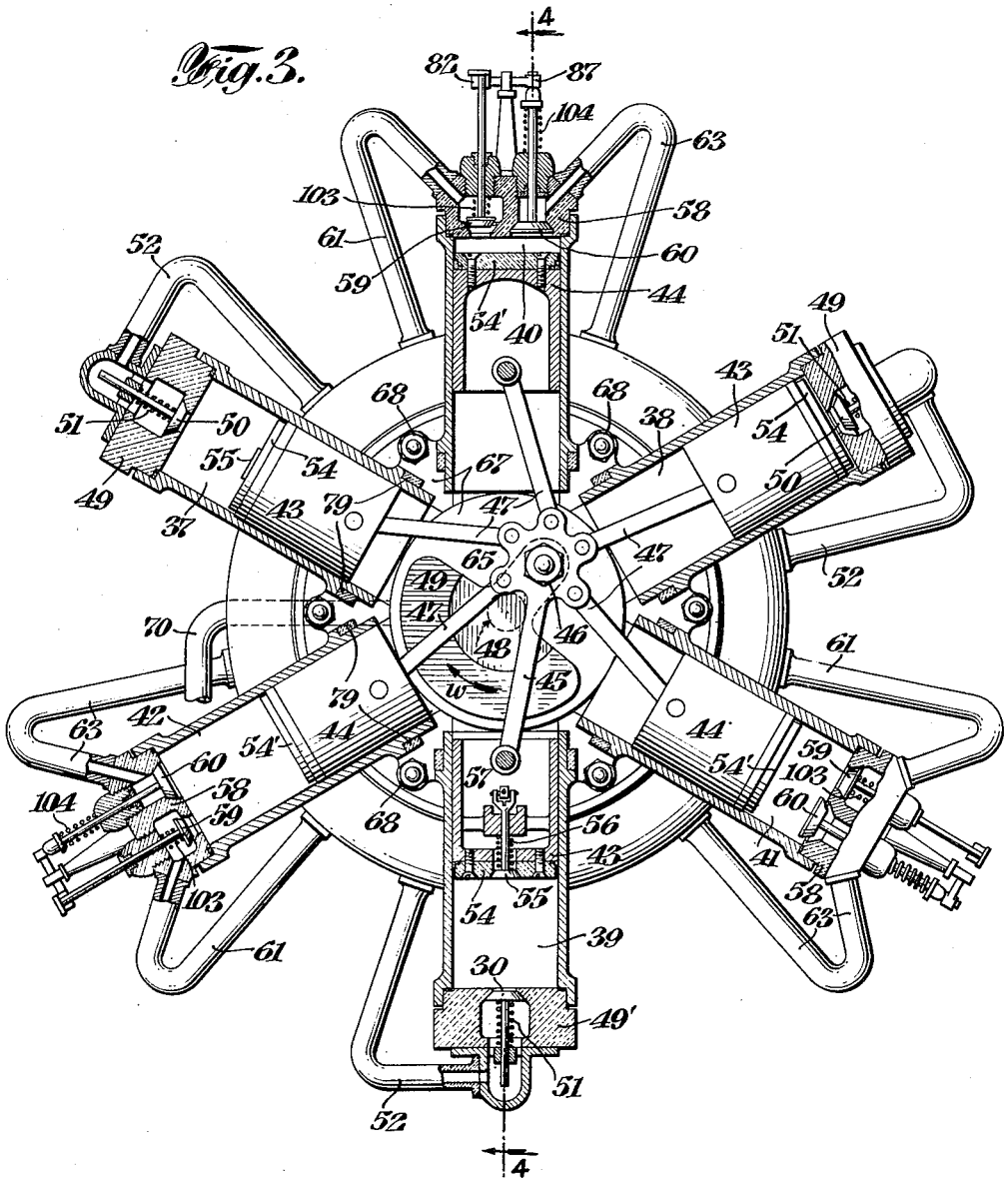

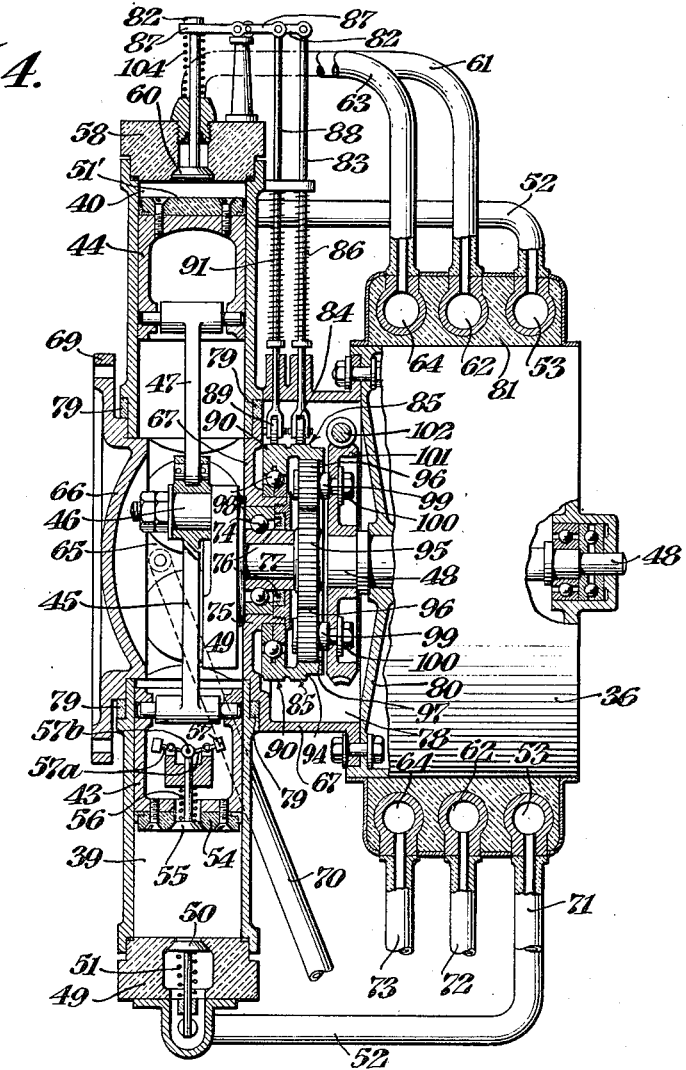

Feb. 9, 1943. R. ESNAULT-PELTERIE 2,310,520
HEATING AND REFRIGERATING PROCESS AND APPARATUS
Filed Oct. 9, 1939 5 Sheets-Sheet 4

INVENTOR
Robert Esnault-Pelterie
BY
Kenyon & Kenyon
ATTORNEYS

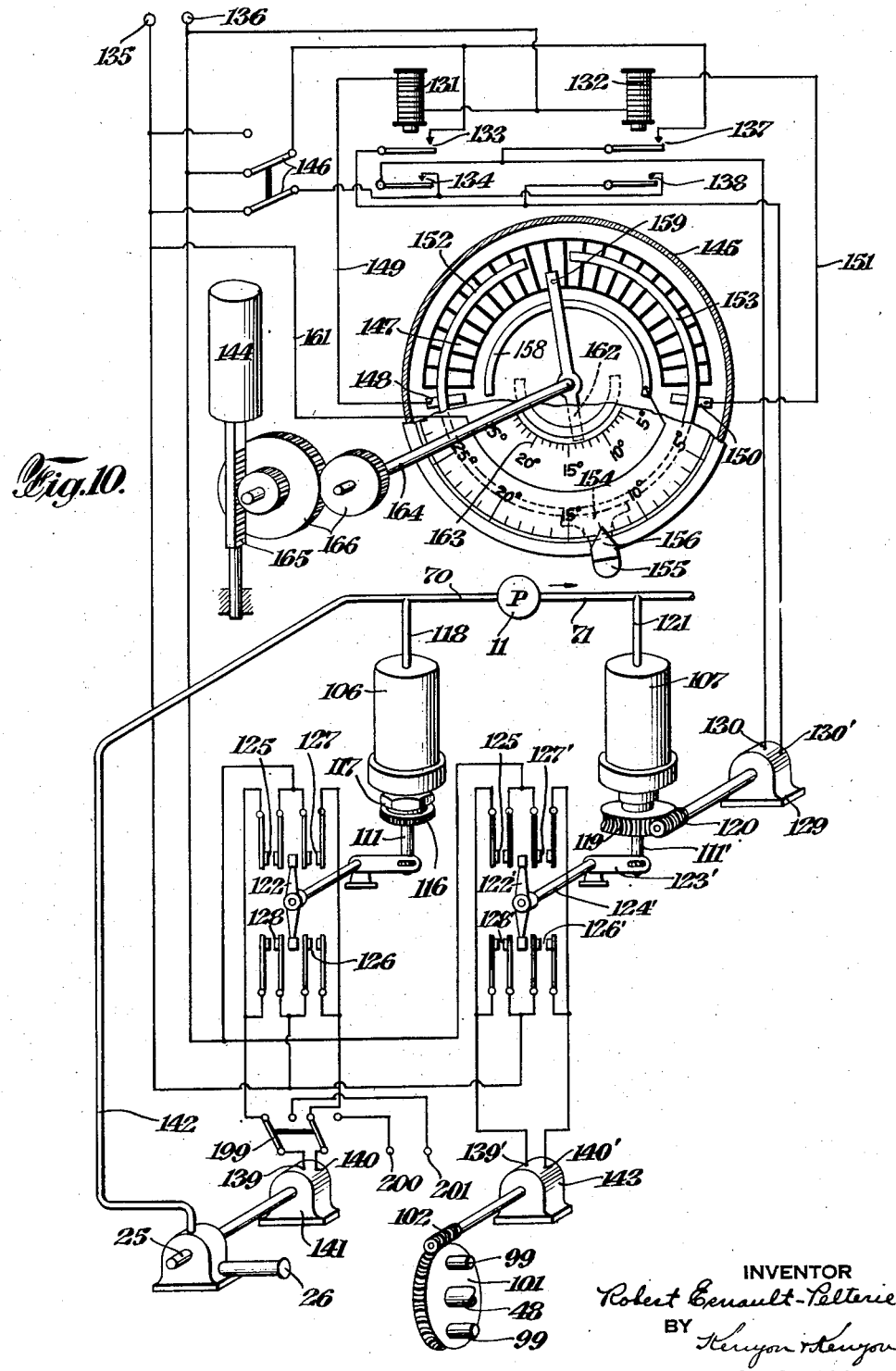

Patented Feb. 9, 1943

2,310,520

UNITED STATES PATENT OFFICE 2,310,520

HEATING AND REFRIGERATING PROCESS AND APPARATUS

Robert Esnault-Pelterie, Boulogne-Billancourt, France; vested in the Alien Property Custodian Application October 9, 1939, Serial No. 298,570
In Switzerland October 10, 1938

23 Claims. (Cl. 62—6)

The present invention relates to an improved process for heating and refrigerating according to the principle of the thermo-pump and apparatus for use in carrying the invention into effect.

The process forming the subject matter of the present invention has more particularly been conceived as an improvement of the thermodynamic heating and cooling processes as applied to inhabited spaces and more particularly to railway cars, but the invention can equally as well be adapted to other purposes, such as the manufacture of ice, for instance.

It has been known for a long time that a Carnot cycle comprised between two absolute temperatures T and $T_o$, if it operate in the sense of a motive force, has an efficiency:

$$R = \frac{T - T_o}{T} < 1 \qquad (1)$$

If on the other ahnd it functions in absorbing work, it separates, so to speak, a certain amount of heat, and a certain amount of cold, the first being necessarily greater than the work expended, and the second being greater or not. By virtue of the principle of the equivalence of the calorific and the mechanical energy, this latter is equal to the difference of the two amounts of heat produced and absorbed.

Therefore, if from a purely utilitarian point of view the efficiency of such an engine be called the thermal efficiency, the quotient of the amount of heat or cold obtained by the amount of work that had to be spent to produce it, then these efficiencies for the heating machine will be:

$$\rho h = \frac{T}{T - T_o} > 1 \qquad (2)$$

and for the cooling or refrigerating machine:

$$\rho r = \frac{T_o}{T - T_o} \lessgtr 1 \qquad (3)$$

the difference between the two efficiencies is always equal to unity.

It is, therefore, seen that theoretically, and by reason of the small differences of temperature that have to be produced to heat or cool inhabited spaces in respect to $T_o$, which is always of the order of 273° absolute, (0° C.), there is nothing in theory to prevent obtaining amounts of cold and especially of heat, that are greatly superior to the work furnished, and even superior to the quantity of heat initially expended in the fuel actuating the steam engine prime mover or the internal combustion engine or other prime mover.

Unfortunately, it is a long way from theory to practice, and the mechanical efficiency of the engines used intervenes in such a form, in the actual operation, that it decreases the advantage to a considerable degree, and can even reduce it to zero if very special precautions are not taken to guard against it.

Heretofore, for a considerable time machines of this type have been used for the production of artificial cold, without however having led to any apparently notable industrial development, since Lord Kelvin first published the principle of the thermo-pump.

According to theory the working fluid can be of any kind whatever; until now, the industry uses only highly compressible fluids, gases or vapors.

The inventor of the present invention has conceived the idea to correct this defect of the gases by using high pressures.

It is well known that according to the kinetic theory of gases, the pressure of a gas is, at a given predetermined pressure, proportional to the number of molecular impingements per unit of time upon a unit of the wall surface. Now, the heat exchange increases proportionally to this number of impingements or shocks. Consequently, by using high pressures, it is possible to obtain a very rapid heat exchange, notwithstanding the working fluid being used, formed at least partially of a gas, and this can be attained with heat exchange surfaces of sufficiently reduced dimensions; and this in its turn is the cause of reduced first costs of the plant, and a considerably increased efficiency, by reason that, due to the rapidity of the heat exchange between the compressed gas and the walls of the heat exchanger it is possible to reduce the difference of temperature on the two surfaces of the heat exchangers.

The improved heating and cooling or refrigerating process according to the present invention is characterized in that working fluid comprising a gaseous substance, is caused to pass through a thermodynamic cycle, the low pressure of which is at least equal to 20 kg./cm.² (about 284 lbs. per sq. in.).

The apparatus for carrying the present process into effect is characterized in that it comprises means to cause a working fluid comprising a gaseous substance, to pass through a thermodynamic cycle, the low pressure of which is at least equal to 20 kg./cm.².

Theoretical analysis of the principle of the present invention has shown that an interesting thermal efficiency can only be obtained when the mechanical efficiency of the apparatus is equal to 95% or even 96%; this is not an easily realizable condition.

In the present description, two means only are described which comply with such requirement, and these are then of considerable importance:

The star disposition of the main pump and fluid motor on the same crank results in opposing the efforts of the different pistons so that the resulting effort is very much smaller than the sum of the composing ones.

The use of a lower pressure at least equal to 20 atmospheres and the application of the said pressure on the external faces of the pistons reduces the difference of pressures on the pistons to the possible minimum and accordingly reduces to the possible minimum the strains on the connecting rods and bearings and the friction which takes place in their articulations.

Correlatively the use of such a pressure renders acceptable the volume and weight of the apparatus, which otherwise, would be prohibitory and similarly for the sections at the valves in which the difference of pressure becomes proportionally very slight when working at 20 atms. whereas it would be prohibitory upon working at 1 atm.

In addition to this the use of high pressures presents the advantage of improving the heat transmission in the heat exchangers.

The star disposition of the main pump and fluid motor on the same crank results in opposing the efforts of the different pistons so that the resulting strain is very much smaller than the sum of the composing ones.

In order that the invention may be clearly understood and readily carried into effect reference is made to the accompanying drawings which show diagrammatically and by way of example heating and refrigerating apparatus in accordance with the present invention.

Figure 3 is a cross section of the motor-pump unit.

Figure 4 is an axial section, along the line 4—4 of Figure 3 of the motor-pump unit.

Figure 5 represents the profile of a cam to control the admission into the motor cylinders of the motor-pump unit according to Figures 3 and 4.

Figure 6 represents the profile of a cam to control the escape or exhaust from the motor cylinders appertaining to the motor-pump unit according to Figures 3 and 4.

Figure 10 is a diagram of the control apparatus for automatic regulation of the intake and discharge pressures of the main pump 11.

*General description of fluid circuit*

Figure 1:
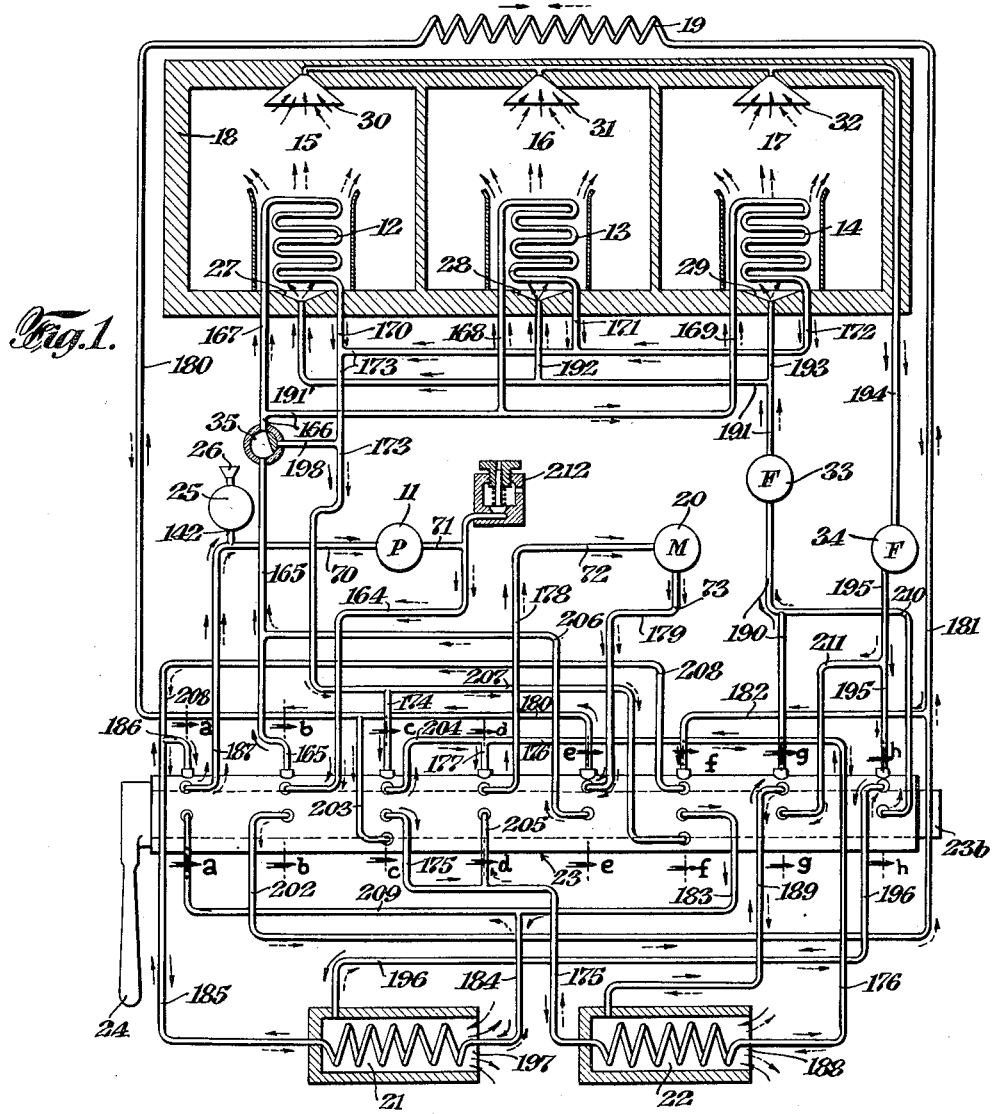
Figure 1 is a diagram of a complete apparatus intended to illustrate the circuits by means of which the working fluid passes through the different members or parts of the apparatus.

The apparatus comprises a normally closed path in which the working fluid circulates. The fluid circuit is shown in Figure 1 and is adapted alternatively either to heat the chambers 15, 16 and 17 or to cool them. Whether the apparatus is adapted to heat or to cool the chambers 15, 16 and 17 depends upon the position of handle 24. Movement of handle 24 rotates core 23b in such manner that the eight valves formed by the drillings therein are shifted into position so as to reverse the piping connections. At the same time the electrical switch 146 (Figure 10) is changed to its opposite position to reverse the control mechanism.

When the apparatus is used for heating the chambers 15, 16 and 17, the cycle of the compressed fluid within the closed circuit is shown by arrows with solid shafts in Figure 1 and is as follows:

(1) The fluid passes through the compressor 11 where its pressure and temperature are raised;

(2) The highly compressed fluid passes through coils 12, 13 and 14 where it gives up heat in counter-current manner to air entering chambers 15, 16 and 17;

(3) The fluid then passes to the heat exchanger 22 where it gives up additional heat by movement in a counter-current manner with respect to fresh air being intaken from the outside atmosphere, and later to be discharged into the chambers 15, 16 and 17;

(4) Having lost most of its heat but relatively little of its high pressure, the fluid then passes to the fluid motor 20 where it is expanded to a lower pressure, the energy derived being used in part to drive the compressor 11;

(5) The fluid then passes to the heat exchanger 19, positioned in the outside atmosphere or in the water of a lake, etc., where it acquires heat;

(6) The fluid then passes to the heat exchanger 21 where it extracts additional heat from the vitiated air being expelled to the atmosphere from the chambers 15, 16 and 17, moving in counter-current relation with respect thereto; and (7) The fluid then passes to the intake side of compressor 11.

When the apparatus is used for cooling the chambers 15, 16 and 17, the cycle of the compressed fluid within the closed circuit is shown by arrows with broken shafts in Figure 1 and is as follows:

(1) The fluid passes through the compressor 11 where it reaches a higher temperature;

(2) The fluid then passes to the heat interchanger 19 where it gives off heat to the outside atmosphere, or to water in a lake or otherwise;

(3) The fluid then passes to a heat exchanger 22 where it moves in counter-current relation to the vitiated air being discharged from chambers 15, 16 and 17 to the atmosphere, and where it gives up more heat;

(4) The fluid then passes to the fluid motor 20 where it is expanded and falls in temperature, the energy derived being utilized in part to drive the compressor 11;

(5) The fluid then passes through the coils 12, 13 and 14 where it moves in counter-current relation to the air being introduced into the chambers 15, 16 and 17 and absorbs heat therefrom;

(6) The fluid then passes to the heat interchanger 21 where it moves in counter-current relation to air being drawn in from the outside atmosphere, and destined for transmission to the chambers 15, 16 and 17, and where the fluid absorbs further heat from this incoming air; and (7) The fluid then passes to the intake side of the compressor 11.

The apparatus has been provided, in order to cause the working fluid to pass through approximately a Joule's cycle.

To that end it comprises in principle and in the sequence in which the fluid passes through them, the following parts, viz:

A main pump compressing the working fluid adiabatically, in order to increase its temperature.

At least one heat exchange member wherein this temperature is lowered according to an approximately isobar regime.

A fluid motor, wherein the working fluid emerging from the heat exchanger expands adiabatically (by producing work, which is recovered for driving the pump) its temperature decreasing co-relatively.

At least one heat exchange member, where the temperature of the working fluid again increases under an approximately isobar regime, the working fluid then returning to the main pump, and beginning the same cycle again.

An auxiliary or external motor (in this case electric) producing the difference between the power absorbed by the pump, and that recovered from the fluid motor, that is to say, producing the mechanical equivalent of the difference of heat absorbed and given off by the fluid during its flow through the heat exchanging organs and to make up for the mechanical losses.

If the problem is to heat a room or space, the radiator will be arranged in this room or space, and a heat absorbing coil will be placed in a medium which may for instance be the ambient air, or water from a river or a lake.

If on the other hand it is intended to cool a room or space, that is to say to produce cold, then the cooling coil is placed in this room or space, and a heat dissipating coil may be placed in a medium such as for instance the surrounding air, or the water from a river or lake.

*General arrangement of the apparatus*

A general arrangement of the apparatus represented in Figure 1 uses air as a working fluid, and comprises the following parts: a main pump 11, which compresses the working fluid; heat exchanging members 12, 13 14 which operate either as radiators or as cooling coils and which are arranged in chambers or compartments 15, 16, 17 respectively of a space to be heated or cooled or refrigerated. Such space might for instance, be a railway carriage or truck, diagrammatically indicated at 18 in Figure 1. Each chamber or compartment may be fitted with a by-pass passage and a tap similar to the cock 35 in order to regulate at will and separately the temperature in each chamber or compartment.

A heat exchange member 19, may be arranged at the outside of the chambers 15, 16, 17 (for example on the roof of a railway carriage or truck) and which is intended either to absorb heat from the surrounding medium, or to give up heat to it according to the case.

A compressed fluid motor 20, wherein the fluid that had previously been compressed by the main pump 11 expands.

A heat exchanger 21, wherein the working fluid gives up heat to the air of aeration (conditioning air) of the chambers 15, 16 and 17 or abstracts heat from this air, according to the case.

A second heat exchanger 22, similar to the heat exchangers 21.

Figure 2:
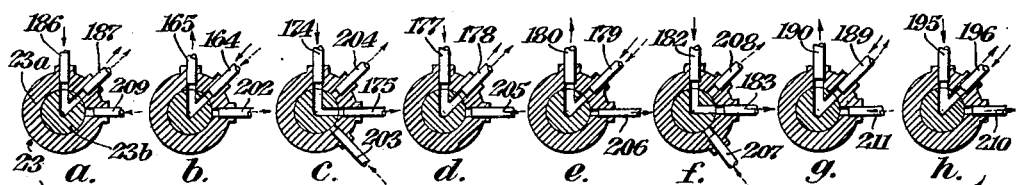
Figure 2 shows 8 sections along the 8 parallel planes $a$, $b$, $c$, $d$, $e$, $f$, $g$ and $h$ (of Fig. 1) of the multiple way plug cock serving to modify the connections between the various members of the apparatus when the latter is intended to be changed over from a heating to a cooling or refrigerating plant, and vice-versa.

A multiple way plug cock 23, comprising a series of 8 plugs connected integrally and simultaneously operable by means of a hand lever 24 common to all and of which Figure 2 shows the cross sections at 8 positions designated by *a, b, c, d, e, f, g, h* in Figure 1. The plug cock 23 comprises a hollow tube 23a provided with openings in which the various piping connections may be secured, and a core 23b rotatably fitting therein and having drillings therein adapted to register with the said openings in the manner shown in the drawings. For example, in Figure 2, section *a*, the shaft-drillings are arranged at that point to provide inter-communication between pipes 186 and 187 when the shaft is in the position shown; when rotated 45° in a clockwise direction pipes 187 and 209 are thereby brought into communication.

An auxiliary pump 25 in communication at 26 with the atmosphere and with the low pressure side of the main pump 11.

A safety valve 212 placed on the high pressure side of the main pump 11.

An aeration-air inlet 27 disposed at the lower part of the heat exchanger 12 in such manner, that the air issuing from 27 comes into contact with the heat exchanger 12 before entering into the chamber 15.

Corresponding inlets 28 and 29 for aeration-air arranged similarly at the lower parts of the heat exchangers 13 and 14 respectively.

A suction funnel 30 for the escape of aeration-air from the chamber 15.

Similar suction funnels 31, 32 placed at the top parts of the chambers 16 and 17 respectively.

A blower 33, forcing air from the outside, after it has passed in one of the two heat exchangers 21, 22 as will be described below, into the chambers 15, 16 and 17.

A second blower 34 drawing air from the chambers 15, 16 and 17, and forcing it outside after forcing it to pass through the other of the heat exchangers 21, 22.

A manually operable plug cock 35 to regulate the heating of the chambers 15, 16 and 17 or the cooling thereof, while allowing a regulatable quantity of the working fluid to be short-circuited, which otherwise would pass through the heat exchangers 12, 13 and 14.

Connecting pipes between the parts above mentioned, which will be hereinafter described in detail.

The apparatus comprises, besides the parts and the piping diagrammatically shown in Figure 1, a motor, the housing of which is shown at 36 in Figure 4, which receives energy from an external source, in order to enable it to supply the difference between the power absorbed by the main pump 11, and the energy recovered by means of the compressed fluid motor 20. The motor 36 is supposed in this example to be an electric motor. It could of course be an internal combustion engine or a hydraulic motor for example.

Finally the apparatus further comprises control or regulating members which are hereinafter described with reference to Figures 4 to 10.

Motor-pump unit

The motor-pump unit shown in Figures 3 and 4 comprises the pump 11 and the fluid motor 20, as well as an electric motor of which only the housing or frame is shown at 36. It should be clearly understood that although Figure 3 shows six cylinders any other suitable number of cylinders may be used, for example 10 in one block. To attain the desired high mechanical efficiency the compressor and pump cylinders should be diametrically opposed to each other and, to reduce vibration and wear, compressor cylinders should be arranged in alternation and pump cylinders should be disposed between the compressor cylinders. This arrangement requires the use of not less than six cylinders to avoid dead center stalling points, although eight or any even number greater than eight may be used. The pump 11 comprises three radial cylinders 37, 38 and 39, arranged at 120°. The motor comprises three cylinders, 40, 41 and 42 similarly arranged star-fashion at a spacing of 120° between each of them, and which can be staggered at 60° in respect of the pump cylinders. A piston 43 reciprocates in each pump cylinder. In each motor cylinder reciprocates a piston 44. One of the pistons 43 is connected to a crank pin 46 by means of a master connecting rod 45. Pivotally connected to the master connecting rod 45 are five connecting rods 47 three of which are in the present case pivotally connected to the pump pistons and the other two to the motor pistons. On the common shaft 48 (which is assumed to revolve at the speed ω) of the motor-pump unit having the motor pump cylinders alternatively arranged star fashion, is mounted the electric motor arranged in its housing 36. A counter-weight 49 is provided on the shaft 48.

The head of each pump cylinder 37, 38 and 39 comprises a block 49 of heat insulating material such as synthetic resin for example, wherein an automatic compression valve 50 is mounted, which is forced against its seat by a spring 51. Each valve 50 controls the passage between the interior of the respective pump cylinder of the pump, and a heat insulated pipe 52. The three pipes 52 lead to a common collector 53. The springs 51 are provided in order that the valves 50 should open automatically, as soon as the pressure in the respective cylinder exceeds the pressure existing in the pipes 52. Each piston 43, 44 is provided on its internal flat face in respect of the cylinder with a heat insulating plate 54, 54' respectively. An automatic valve 55 is arranged in each piston 43; it is acted upon by a spring 58 tending to hold it off its seat. Two lever arms 57a, pivoted near their midpoints on pivots secured to the piston, are pivotally secured upon a common pin 57b secured to the stem of the valve 55. Counterweights 57 are mounted upon the opposite ends of said levers. Valves 55 are slightly underbalanced so that they have a tendency to open at the end of the outward stroke, but are prevented from so doing by the excess pressure of the compressed and expelled air over that one which prevails in the crank-case until the piston comes back, causing a sufficient fall in the pressure prevailing within the cylinder. Likewise, at the end of the inward stroke, valves 55 have a slight tendency to close, but are prevented from so doing by being sucked toward the cylinder until the piston starts its outward stroke, thereby putting an end to the suction effect.

Each of the cylinders 40, 41 and 42 of the motor is provided with a cylinder head 58 made of heat insulating material, and therein is positioned a controlled admission valve 59, and a controlled exhaust valve 60. Each valve 59 controls the communication between a heat insulated pipe 61 and the respective cylinder. All the pipes 61 lead to a common collector 62 (Figure 4). Each valve 60 controls the communication of one of the cylinders with a heat insulated pipe 63. The three pipes 63 lead to a common collector 64 (Figure 4). The valves 59 and 60 are held on their seats by springs, which are shown in Figure 3, and are indicated by 103 for the valves 59 and by 104 for the valve 60. These valves are operated as hereinafter described.

The open ends of the six cylinders shown in Figure 3 are connected to a common chamber 65 (Figure 4) wherein the six connecting rods, the crank pin 46, and the counterweight 49 move. This chamber is formed by the assembly of the two halves 66 and 67 of the housing, which are secured together by bolts (not shown) said bolts pass through lugs 68, of which only those of the half 67 are shown in Figure 3. The half 66 (Figure 4) of the housing is provided with a flange 69, which serves to secure the unit, for instance under the floor of a carriage or truck. The interior of the chamber 65 is in communication with a heat insulated pipe 70. The collectors 53, 62 and 64 (Figure 3) are each connected to a heat insulated pipe, denoted respectively by 71, 72, 73. A ball bearing 74, mounted in the interior of a hub 75 of the member 67 of the housing serves as a bearing or support for the shaft 48. A cup leather 76, held in position by a disc 77 screwed into the hub 75 ensures the chamber 65 being fluid tightly separated from another member 78 formed by the part 67 of the housing. An insulating ring 79 is provided around the base of each cylinder, in order to reduce as much as possible the heat losses by conduction between the six cylinders and the housing 66, 67 on which the cylinders are mounted in a manner not shown but known per se.

An end plate 80 of the housing 36 of the electric motor is bolted to a flange provided on the member 67 of the housing. The collectors 53, 62 and 64 are arranged on the periphery of the motor housing 36, and are surrounded by a covering of heat insulating material 81.

Advance and retard of the valves

The motor 20 which can be seen in detail in Figures 3 and 4 is a piston or reciprocating motor with its cylinders arranged star fashion. Considering that in this case we have to deal with a compressed fluid motor with its cylinders, the working fluid is admitted and exhausted once per each revolution of the motor into and from each cylinder. The consecutive cylinders 40, 41 and 42 therefore work one after the other, in the order corresponding to the direction of rotation of the motor (see arrow w in Figure 3).

In the same manner as in the case, which is similar to this one, of the known distributions in 4 cycle explosion motors with an odd number of cylinders arranged in star fashion, it is possible to use one single cam for the control and actuation of all the inlet valves, and a further cam for the exhaust valves of a compressed fluid motor with its cylinders of the type shown. To that end it is possible to use two cams, both turning either in the direction of the rotation of the motor or in the opposite direction.

Consider in the first instance the case, where the cams rotate in the opposite direction to the direction of rotation of the motor, with its cylinders which corresponds to the embodiment shown in the drawing.

Consider also the generic case of a compressed fluid motor of N cylinders, N being an odd number and call $\alpha$ the angle $2\pi/N$ which the axes of two consecutive cylinders form between them.

Take as a reference datum on one cam, the admission cam for instance, a cam boss and let it be assumed that said boss is opposite to cylinder 1.

Between two successive admissions, for instance between the admission to cylinder No. 1 and to cylinder No. 2, since the cylinders receive the fluid in the order of their numbers, the motor will have turned by an angle $\alpha$. At this moment the following boss of the cam under consideration must be opposite to cylinder No. 2. If it be admitted that the cam has turned through an angle $(-x)$ then this second boss forms with the first boss considered, an angle (1) $$\beta = \alpha + x$$

Now whatever the values of N and $x$ may be, it is evident that at the end of one revolution of the motor, it must be the second boss of the cam that replaces the first in its functions vis-a-vis cylinder No. 1.

It is therefore evident that the angle $(\alpha+x)$ is determined by two requirements, viz:

(1) It must be a fraction of $2\pi$.

(2) The cam must, at the end of one revolution of the motor, have rotated by the amount of $\beta$. Now if in one revolution of the motor, that is $2\pi$, the cam rotates by $\beta$, then the angle $x$ by which it has rotated while the motor has only rotated by $\alpha$ is such that $$\frac{\beta}{x} = \frac{2\pi}{\alpha} = \frac{N\alpha}{\alpha} = N$$

whence $$x = \frac{\beta}{N}$$

and as $$\beta = \alpha + x = \frac{2\pi}{N} + \frac{\beta}{N}$$

$$\beta = \frac{2\pi}{N-1}$$

Therefore in the case where the cam rotates in the opposite direction to that of rotation of the motor, the cam must have $(N-1)$ bosses, and as it must revolve by $2\pi/N-1$ while the motor revolves by one revolution, i. e. by $2\pi$, its speed must be $(N-1)$ times smaller than that of the motor.

If on the other hand it be desired that the cam should rotate in the same direction of rotation as the motor, Equation 1 only would have to be modified, and would become $$\beta = \alpha - x$$

We would still have $$\beta = N$$

which would give $$\beta = \alpha - x = \frac{2\pi}{N} - \frac{\beta}{N}$$

from which:

$$\beta = \frac{2\pi}{N+1}$$

It may be deduced therefrom that, in the case of the cam rotating in the same direction as the motor, it would be necessary to provide $(N+1)$ bosses on it and rotate it at $(N+1)$ times the speed of the motor.

In the embodiment shown in Figures 3 and 4, the motor comprises three cylinders, 40, 41 and 42, if it be desired that both the admission cam and the exhaust cam rotate in the opposite direction to that of the motor, two bosses will have to be provided on each of them, and they will have to rotate at a speed of revolution equal to half that of the motor shaft.

In the embodiment shown, each admission valve 59 is controlled and actuated by a forked tappet lever 82 (Figure 3) on which one end of a rod 83 acts (Figure 4). On the other end of the rod 83 a roller 84 is rotatably mounted, which follows the curve of the common admission cam 85. A strong spring 86 arranged on the rod 83 causes the roller 84 to be pressed on and to follow the contact curve of the cam 85. Each exhaust valve 60 is controlled and actuated by a lever 87 acting as a tappet, on which one end of a rod 88 acts, a follower roller 89 rolling on a common exhaust cam 90 being rotatably mounted on the other end of the said rod. A strong spring 91 disposed around the rod 88 causes the roller 89 to be constantly applied against the common cam 90.

Figure 5 shows the profile of the admission cam 85 rotating at half the angular velocity and in the opposite direction of that of the shaft 48. On this cam the two points corresponding respectively to opening and closing of the admission in the course of a first revolution of the motor having been designated by $OA_1$ and $FA_1$; $OA_2$ and $FA_2$ designate the corresponding opening and closing points of admission during the course of the next revolution.

Figure 6 shows the profile of the cam 90 for the exhaust $OE_1$ and $FE_1$ indicate respectively the points corresponding to opening and closing of the exhaust during the course of a first cycle of the motor, $OE_2$ and $FE_2$ indicating the two corresponding points of opening and closing of the exhaust respectively, in the course of the following revolution.

Figure 7:
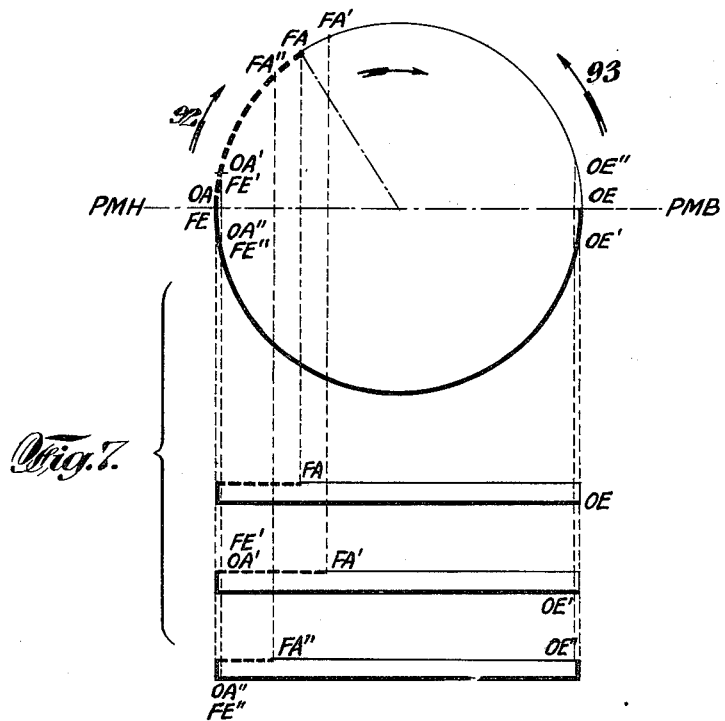
Figure 7 is a diagram of a control arrangement and is intended to explain the effect produced by the change of position of the cams according to Figures 5 and 6.

In Figure 7, OA, FA, OE, FE, designate respectively opening of the admission, closing of the admission, opening of the exhaust, and closing of the exhaust of any one of the motor cylinders, relatively to the position of the crank pin 46 (circular diagram) and of the corresponding piston (rectilinear projections) in considering one revolution of the crank pin, in the case of normal admission.

For reasons that will be hereinafter mentioned, it is desirable to be able to increase or decrease the degree of admission to the cylinders, that is to say, that fraction of the piston stroke during which the admission takes place, without thereby causing any sensible variation of the exhaust. This is effected by acting on the cams 85 and 90 in such a manner, that the four points OA, FA, OE and FE, shall be subjected to an equal angular displacement. When the degree of admission is to be increased the displacement shall be such that the four points in question pass respectively to OA', FA', OE', FE'. If on the contrary it be desired to decrease the degree of admission, the displacement will be such that the four points in question pass respectively to OA'', FA'', OE'', FE''. In the case of an increase in the degree of admission the displacement will therefore take place in the direction of the arrow 92, in such manner that the cams operate later on the follower rollers, than is the case with normal admission. In the case of a decrease of the degree of admission, the cam displacement will be effected in the direction of the arrow 93, in such manner, that the bosses on the cams act earlier on the follower rollers during the revolution than is the case with normal admission.

It will be noticed that in the projection on the path of the piston it is only the point FA that has undergone a sensible linear displacement by reason of these angular displacements. The points OA, OE and FE do in fact only undergo an insignificant linear displacement, because of the fact, that they always remain in the immediate proximity of the dead centres PMH and PMB.

The cams 85 and 90 are shaped on the periphery of a crown 94, rotated at half the speed of that of the shaft 48, and in the opposite direction thereto, by means of a differential gear permitting the angular displacement of these cams to be effected. The aforesaid differential gear comprises a gear wheel 95 (Figure 4) keyed on the shaft 48, planetary gears 96, the diameters and the number of teeth of each of them being equal to half the diameter and half the number of teeth of the wheel 95, and which mesh with the gear wheel 95 and with internal gear teeth 97 provided on the member 94. The diameter and the number of teeth of the gearing 97 are equal to twice the diameter and number of teeth of the wheel 95.

The crown 94 is adapted to run freely on the hub or boss 75 by means of ball bearings 98.

The shafts 99 of the planetary gears 96 are mounted by means of rods 100, on a worm wheel 101, loosely mounted on the shaft 48, and adapted to be angularly displaced by means of a worm 102.

It is evident that by turning the worm 102 by a certain amount in one direction or the other, this determines, by means of the differential gearing, an advance or retardation of the action of the cams on the followers 84 and 89 relatively to the position of the crank pin 46.

It clearly appears from Figures 3 and 4 that the angular shift of the cams in the direction of a retardation in the admission, must be effected by rotation the worm wheel 101 in the direction of rotation of the motors (arrow 105, Figure 7), since a retardation of the cam action on the followers is thereby obtained. In order to obtain an advance in the admission, it will therefore be necessary to turn the worm wheel 101 a certain amount in the opposite direction.

*Regulating apparatus (Figure 10)*

Figure 8:
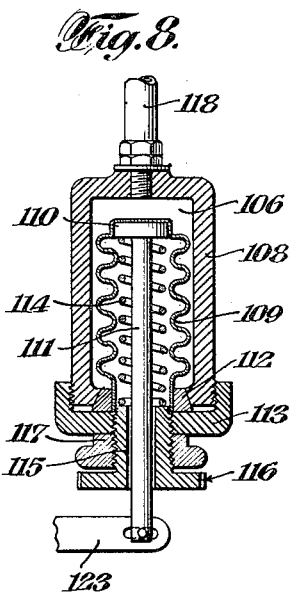
Figure 8 is a detailed view showing in section a manometric device for use in controlling the operation of an auxiliary pump intended to compensate the difference of pressure of the intake side of the motor-pump unit shown in Figures 3 and 4.
Figure 9:
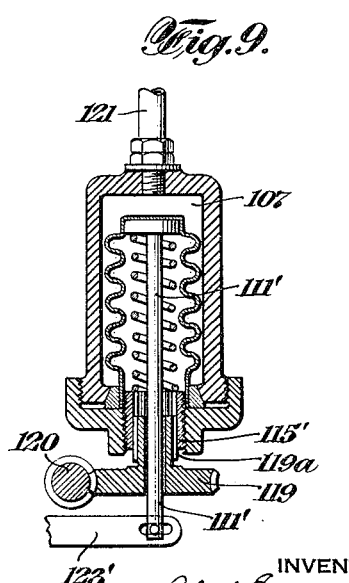
Figure 9 is a detailed view showing, in section, another manometric device to control the automatic change of position or shift of the cams according to Figures 5 and 6, for correcting the differences of pressure on the discharge side of the motor-pump unit according to Figures 3 and 4.

The regulating apparatus according to Figure 10 comprises a manometric device 106, shown in section in Figure 8, and another similar manometric device 107 shown in section in Figure 9. These devices may be of any suitable type known per se. The function of these devices is to maintain the low pressure and the high pressure of the pump 11 at predetermined levels.

The manometric device 106 comprises a cylindrical chamber 108, in the interior of which there is arranged an undulated metallic tube 109, of which the end which extends into the interior of the chamber 108 is closed by a head 100 carried by a rod 111 which extends outwardly of the chamber 108 and the tube 109. The top end of the tube 109 is soldered on to the head 110 in such manner that there is no communication whatever between the interior of this tube and the interior of the chamber. At its lower end the tube 109 is open, and is soldered to a conical annulus 112 fitted into the mouth of the chamber 108 so as to close it hermetically. The conical annulus 112 is held in place by a cap 113 screwed on to the wall of the chamber 108. A spring 114, slipped over the rod 111 abuts at one end against the head 110, and at the other end against an adjustment bolt 115 provided with a knurled head 116 which can be locked by means of a lock nut 117. The rod 111 passes loosely through the nut 116, so that the interior of the tube 109 is constantly at atmospheric pressure. The spring 114 tends to cause the head 110 to penetrate further into the chamber 108, than the tube 109 will permit. The interior of the chamber 108 is in communication with a tube 118 connected to the pipe 70 (Figure 10). Thus the interior of the chamber 108 is at the pressure existing in the low pressure side of the pump 11, that is to say at the pressure existing in the crank or gear housing (chamber 65) of the motor-pump unit shown in Figures 3 and 4. It will be readily understood therefore, that, for a given adjustment of the bolt 115 the rod 111 occupies a position that is a function of the pressure on the intake side of the pump.

The manometric device according to Figure 9 is similar to the manometric device according to Figure 8. It differs therefrom by the fact, that the bolt 115', otherwise identical with the bolt 115, instead of being provided with a knurled head to permit of manual adjustment, is designed to be actuated through a spline 119a by a worm wheel 119 which meshes with a worm 120. It further differs also by reason of the fact that there is no lock nut 117. The manometric device 107 is connected by means of a tube 121 to the pipe 71 (Figure 10) wherein is the working fluid at a pressure equal to the discharge pressure of the pump 11. It will be understood that the rod 111' of the manometric device 107 normally occupies a position which is a function of the pressure on the discharge side of the pump 11.

The rod 111 of the manometric device 106 actuates a comutator switch 122 by means of a lever 123 rigidly mounted on a shaft 124. The commutator switch 122 is provided for the purpose of controlling four contacts 125, 126, 127 and 128. In its normal position the commutator switch leaves the four contacts open. This normal position corresponds to the position occupied by the rod 111 of the manometric device 106, when the pressure on the intake side of the pump is equal to a predetermined value, for which the manometric device 106 has been previously set. When the pressure on the intake side of the pump exceeds the value as predetermined, the rod 111 moves downwards, thereby causing the commutator switch arm 122 to turn in a clockwise direction (as seen in Figure 10), thus closing the contacts 127 and 128. On the other hand, when the said pressure of the pump 11 drops below the above mentioned predetermined value, the rod 111 ascends moving the commutator switch arm 122 in an anti-clockwise direction (as seen in Figure 10), thus causing the contacts 125 and 126 to be closed.

The rod 111' of the manometric device 107 actuates a commutator switch 122' by means of a lever 123' rigidly mounted on the spindle 124'. The commutator switch 122' is provided to control the contacts 125', 126', 127' and 128'. In its normal position this switch does not affect the said four contacts and they remain open. This normal position, corresponds to the normal position occupied by the rod 111' of the manometric device 107, when the pressure on the discharge side of the pump 11 is equal to a predetermined value, according to the position occupied by the bolt 115', that is to say, according to the adjustment at the time being of the manometric device 107. When the said pressure of the pump 11 exceeds this value, previously determined, the rod 111' moves downwards, thereby rotating the commutator switch arm 122' in a clockwise direction, (as seen in Figure 10), thus closing the contacts 127' and 128'. If, on the other hand, the pressure on the discharge side of the pump 11 drops below the above mentioned predetermined value, the rod 111' ascends, thereby rotating the switch arm 122' in an anti-clockwise direction (as seen in Figure 10), thereby causing the contacts 125' and 126' to be closed.

The worm 120 is an integral part of the shaft of a small electric motor 129. In the arrangement shown, the motor 129 is of the reversible type, such reversal being effected by reversing the supply current at its terminals 130, 130'.

Two relays 131, 132 and a reversible switch 146 control by means of their contacts the running of the motor 129 in one direction or the other.

It will be seen from Figure 10 that for the position of the reversing switch 146 shown, the contacts 133, 134 of the relay 131 are connected to the supply mains 135 and 136 in such manner, as well as to the terminals 130 and 130' of the motor 129, that when this relay is energized and its contacts are closed, the mains 135 and 136 are connected to the terminals 130 and 130' of the motor 129, and that the latter will rotate in a direction to effect the screwing in of the bolt 115' by reason of the rotation of the worm 120 and the worm wheel 19. It is also evident that for the same position of the reversing switch 146, the contacts 137, 138 of the relay 132 are connected to the supply mains 135, 136 and to the terminals 130 and 130' of the motor in such manner that, when the relay 132 is excited, its contacts consequently close, and the mains 135 and 136 are respectively connected to the terminals 130 and 130' of the motor 129, which will then rotate in a direction opposite to the previous direction of rotation, that is to say, in a direction to effect the unscrewing of the bolt 115' by reason of the reversed rotation of the worm 120 and the worm wheel 119. If the reversing switch is in the other position, the action of the relays 131 and 132 is reversed in so far as the connections of the terminals of the motor 129 to the supply terminals are concerned, as can be easily seen from the diagram. The reversing switch 146 occupies the position shown when the installation is used for heating purposes. In case it is used for cooling the reversing switch occupies the other position.

The contacts 125, 126, 127 and 128 serve for the purpose of controlling the supply of current from the mains 135, 136 to the terminals 139, 140 of another small electric motor 141.

It will be seen from Figure 10, that these four contacts are connected in such manner that, when the contacts 125 and 126 are closed, the mains 135 and 136 are connected respectively to the terminals 140 and 139, and that when the contacts 127 and 128 are closed, the mains 135 and 136 are connected to the terminals 139 and 140 in the reverse manner. In the arrangement shown, the motor 141 is of the reversible type and can be reversed by reversing the current supply. The motor 141 drives the auxiliary pump 25. This auxiliary pump is connected on one side to the atmosphere at 26 as already mentioned and on the other side, by means of a pipe 142 to the pipe 70 on the intake side of the main pump 11. The motor 141 is provided for the purpose of driving the auxiliary pump 25 in a direction to effect the compression of the ambient air in the pipe 142 and thus on the intake side of the main pump 11, when the pressure on the intake side of this pump 11 drops below the predetermined value for which the manometric device 106 is set, that is to say, when the contacts 125 and 126 close. If the pressure on the intake side of the pump exceeds a predetermined value, contacts 127 and 128 then close and cause the auxiliary pump to rotate in such direction that it now sucks the air from the intake side of the pump 11, and forces it out into the atmosphere. The auxiliary pump 25 automatically cuts off communication between the atmosphere and the pipe 142, when not in action.

The contacts 125', 126', 127' and 128' control the supply of current from the mains 135, 136 to the terminals 139', 140' of a small electric motor 143. These four contacts are connected in such manner that, when the contacts 125' and 126' close, the mains 135 and 136 are connected respectively to the terminals 140' and 139', and that when the contacts 127' and 128' close, these mains 135 and 136 are connected respectively to the terminals 139' and 140' of the motor 143. This motor is also of the reversible type and can be reversed by reversing the current flowing through it. The motor 143 actuates the worm 102. The motor 143 serves the purpose of rotating the worm 102 in a direction corresponding to a displacement of the worm wheel 101 and of the shafts 99 of the planetary gears 96 (Figures 4 and 10) in the direction of the arrow 93 (Figure 7) thus causing a decrease of the admission, when the contacts 125' and 126' close by reason of a drop in the discharge pressure of the pump 11 below the value determined according to the actual position of the regulating bolt 115. The motor 143 causes the worm 102 to rotate in a direction to effect a displacement of the shafts 99 (Figures 4 and 10) in the direction of the arrow 92 (Figure 7), which means an increase of admission, when the contacts 127' and 128' close by reason of a rise of the discharge pressure of the pump 11 above the value corresponding to the momentary position of the regulating nut 115' of the manometric device 107.

From the preceding description it is evident that:

When the pressure on the intake side of the pump 11 drops below a fixed predetermined value, the auxiliary pump 25 automatically starts in order to correct this pressure difference by delivering compressed air to the intake side of the pump 11.

When the pressure on the intake side of the pump 11 exceeds the predetermined value, the auxiliary pump automatically starts in order to correct this pressure difference, by sucking compressed air from the intake side of the pump 11 and delivering it into the atmosphere.

When the pressure on the discharge side of the pump 11 drops below a predetermined value corresponding to the actual position of the regulating screw nut 115' of the manometric device 107, the motor 143 automatically starts up in order thereby to displace the cams (Fig. 4) in the direction corresponding to an increase in the admission, in relation to the stroke of the piston, which in its turn tends to correct the difference in pressure which caused the motor 143 to come into play.

When the pressure on the discharge side of the pump 11 exceeds the value corresponding to the actual position of the regulating nut 115' of the manometric device 107, the motor 143 automatically starts up, in order to displace the cams in the direction of a decrease of the admission in relation to the stroke of the piston, which in its turn tends to correct the difference of pressure which started up the motor 143.

The excitation of the relays 131 and 132 is controlled by a thermostat element 144, by means of a control member 145. The thermostat element 144 is of the type known per se comprising a movable member, moving it accordance with the temperature, and can be placed for instance in the place to be heated or cooled (that is to say, the chambers or compartments 15, 16, 17), or it can be caused to be in contact with the circulating fluid at a chosen point in the latter's circuit. Generally speaking, it reacts in accordance with the heating or the cooling produced by the apparatus.

The function of the thermostat element 144 is to cause an automatic increase in the radio between the discharge and intake pressures of the pump, when the heating or cooling produced by the installation becomes insufficient, and in order to produce a decrease of this ratio, if the heating or cooling effect produced becomes excessive.

The function of the control member 145 is to enable the desired temperature to be predetermined by choice or more precisely the temperature limits which it is desired to obtain and maintain in the place where the thermostat element 144 is placed.

It is evident that an insufficient heating causes a drop in the temperature in the thermostat element below the predetermined value (or more exactly below the minimum limit fixed) whereas an insufficient cooling causes this value (or the maximum limit fixed) to be exceeded.

The control member 145 comprises a series of contacts 147 electrically insulated from one another, and arranged in a semi-circle. It moreover also comprises a contact 148 arranged the same distance from the center as the contacts 147, but beyond one end of the semi-circle formed by the series of contacts 147. This contact 148 is connected by a lead 149 to one terminal of the relay 131, the other terminal of the relay 131 being connected to the main 136. A similar contact 150 is arranged beyond the other extremity of the semi-circle formed by the series of contacts 147. The contact 150 is connected by a lead 151 to one terminal of the relay 132, the other terminal of the relay 132 being connected to the main 136. An electrically conductive segment 152 slightly less than a semi-circle rests upon the contacts 147. This segment 152 is mechanically connected with a similar segment 153 by means of an insulated piece 154, which is rigidly connected to a handle 155 provided with an index 156, adapted to be displaced relatively to a scale 157. The segment 153 also rests on the contact 147. If the handle 155 be turned the two conductive segments 152 and 153 turn with it around the centre of the semi-circle formed by the contacts 147. According to the position occupied by the handle 155 and the index 156, certain contacts 147 (the first ten from the left in the drawing) are connected to the contact 148 by means of the segment 152, whereas others (the first thirteen on the right, for the position shown in the drawing) are connected to the contact 150 by means of the segment 153. In the interval comprised between the two free ends of the segments 152 and 153, there remains a small number of contacts (the 11th and the 12th from the left, in the embodiment shown in the drawing) which are not connected electrically either to contact 148 or to contact 150. A conductive segment 158 of slightly more than a semi-circle, is arranged concentrically to the arc formed by the contacts 147, 148 and 150. The segment 158 starting from the lower radial edge of the contact 148 extends to the lower radial edge of the contact 150. A movable brush 159 is mounted on an arm 160 which is pivotally mounted at the common centre of the segment 158 and of the semi-circle formed by the contact 147. The brush 159 electrically connects the segment 158 with the contacts 147 by contact therewith. The brush 159 slides over the segment 158 and over the series of contacts 147 when the arm 160 is turned. The segment 158 is connected to the main 135 by means of a lead 161. The arm 160 is provided with a pointer 162, which moves over a graduated scale 163. The arm 160 is rigidly mounted on a spindle 164 which is caused to rotate by the motion of a rack 165 transmitted to it by means of speed increasing gears 166. The rack 165 is fixed to the moving member of the thermostat element 144. Movement of the rack 165 is brought about by a change in temperature reflected by movement of the thermostat element 144. In turn, movement of the rack 165 causes, through the mechanism described, a corresponding movement of the brush 159 and of the pointer 162. The scale 163 is so calculated that the pointer 162 directly indicates the temperature corresponding to the position of the movable member of the thermostat element 144.

In Figure 10 it will be observed that, if the reversing switch 146 be in the position shown which corresponds to the case of heating and the index 156 is moved into any desired position in relation to the scale 157, the brush 159 may be in contact either with one of the contacts 147 touched by the segment 152 or by the segment 153, or with one of the contacts 147 which is touched neither by the segment 152 nor by the segment 153. When the brush 159 is in contact with any one of the contacts 147 which is then connected to the contact 148 by the segment 152, the relay 131 is excited by closing the following circuit: main 135, conductor 161, segment 158, brush 159, contact 147 in contact with the said brush, segment 152, contact 148, conductor 149, relay 131 to main 136. The relay 132 is then inoperative. When the brush 159 is in contact with any one of the contacts 147 which is connected to the contact 150 by means of the segment 153, the relay 132 is energized by closure of the following circuit: main 135, conductor 161, segment 158, brush 159, contact 147, at the time in contact with the said brush, segment 153, contact 150, conductor 151, relay 132 and main 136. The relay 131 is then inoperative. When the brush 159 is in the position shown in Figure 10, where it is in contact with some of the contacts 147 which are touched neither by the segment 152 nor the segment 153, then both the relays 131 and 132 are inoperative, their energizing circuits being open. If by reason of a variation of the temperature of the locus or place in which the thermostat element 144 is placed, the brush 159 moves in a clockwise direction, from the position shown in Figure 10, to a sufficient amount to come into contact with a contact 147 that is touched by the segment 153, then the relay 132 is instantly energized. It will only become dead at the moment when the brush 159 has returned to one of the contacts 147 not touched by the segment 153. If, on the contrary, the variation of temperature in the place or locus wherein the thermometric element 144 is placed be such that the brush 159 moves anti-clockwise from the position shown, by a sufficient amount to come into contact with one of the contacts 147 touched by the segment 152, then the relay 131 becomes instantly energized the moment the said brush touches the first of the said contacts. The relay 131 will go dead the instant the brush 159 breaks contact with one of the contacts 147 touched by the segment 152.

This distance between the free ends of the segments 152 and 153 determines the scale of the admissible temperature, that is to say, the margin tolerated on both sides of the fixed value, and the fixed value is determined by the position of the index 156 in relation to the scale 157.

From the foregoing it will be understood that when the reversing switch 146 is in the position for heating (the position shown in Fig. 10) an increase in the temperature at the thermostat device exceeding the tolerance above the fixed value as set by the position of the index 156 on the scale 157, causes the relay 132 to become energized. When the said reversing switch is in the position for cooling, the same increase in temperature causes the relay 131 to become energized.

Similarly, a decrease in temperature produces the excitation of the relay 131 in the case of heating and of the relay 132 in the case of cooling or refrigeration. It has already been stated that the excitation of the relays 131 and 132 by means of the motor 129, the worm 120, the worm wheel 119 and the nut 115' causes a modification of the regulation of the manometric device 107. The action of the relay 131 is to displace the regulation or adjustment towards the higher pressure, that of the relay 132 is the reverse. Thus, an increase of the difference between the discharge pressure and the intake pressure of the main pump increases the heating, or the cooling effect produced by the apparatus. A reduction of the said difference produces the opposite effect. In consequence, the regulating devices shown in Figure 10 will constantly tend to correct the excess and the insufficiencies of the heating and the cooling.

The reversing switch 146 is preferably made mechanically integral or rigid with the multiple way plug cock 23 (Fig. 1), in order that by simply moving the handle 24 it shall cause at the same time both the plug cock 23 and the reversing switch 146 to pass from the heating position (shown) to the cooling position.

The operation of the apparatus will now be described, after briefly indicating how to start the apparatus working.

*Operation on starting the apparatus*

To start the apparatus, the multiple way plug cock handle 24 and the reversing switch 146 are in the first instance moved into their proper position. If the apparatus be required to heat, this cock should be in the position shown in Figure 2, and the reverser in the position shown in Figure 10. If, on the contrary, the apparatus is to be used for cooling, then the whole unit of the eight plugs of the cock 23 is turned by 45° in a clockwise direction (as the parts appear in Fig. 2) by means of the handle 24 (Fig. 1). As previously mentioned, these plugs and the switch 146 are preferably mechanically and positively interconnected in such manner, that for this new position of the multiple way cock, the switch 146 shall be in its other position to that shown in Fig. 10.

This done, the apparatus can be started for example in the following manner:

At the beginning only the circuits of the electric motors 36 and 141 are closed (Figs. 4 and 10). This is effected by closing on the one hand the circuit, not shown, of the motor 36, and on the other hand by moving a double commutator switch 199 (Fig. 10) into a position where it connects the terminals 139, 140 of the motor 141 to a source of current the mains of which are denoted by 200 and 201. The motor 36 (Figures 3 and 4), then starts to rotate the shaft 48, which then drives the main pump 11 and the reciprocating or piston motor. At the same time the auxiliary pump 25 supplies compressed air to intake pipe 70 of the main pump 11. Matters are left thus until the pressures in intake pipe 70 and discharge pipe 71 have attained the desired values. Once this is obtained, the circuit of the electric motor 36 is left closed and the commutator switch 199 is brought back to the position shown in Figure 10, while the mains 135, 136 shown in Figure 10 are energized with current from a source not shown.

From that moment onwards the apparatus works normally.

*Operation when used for heating*

The arrows shown in full lines in Figure 1 indicate the flow of circulation when the apparatus is used for heating. The working fluid in the intake pipe 70, at a pressure of from 20 to 50 kg./cm.$^2$ (approximately 284 to 711 lbs. per sq. in.) or more, is compressed by the pump 11 until it reaches a pressure double or more that of the intake pressure, but at least equal to 35 kg./cm.$^2$ (approximately 498 lbs. per sq. in.). This compression, approximately adiabatic, raises the temperature of the working fluid. The working fluid issuing through the discharge pipe 71 from the pump passes successively through a pipe 164, the plug passage way b (Figure 2) of the multiple cock 23, a pipe 165, the cock 35, and passes from there first of all into the pipe 166, thereupon respectively through the pipes 167, 168 and 169 to the radiators 12, 13 and 14. In these radiators the working fluid gives up heat to the chambers or compartments 15, 16 or 17 at an approximately isobar rating or regime. Its temperature thus drops. The working fluid leaves these radiators respectively through the pipes 170, 171 and 172, then passing into a common pipe 173, from whence it passes successively into a pipe 174, leading it to the plug at the position c (Figure 2) of the multiple way cock 23, from which it flows through a pipe 175 leading to the heat exchanger 22. The working fluid passes out of the heat exchanger 22 through a pipe 176 and then flows to the plug way as at d via a pipe 177; it leaves this plug by means of a pipe 178 leading it through the pipe 72 to the compressed fluid motor 20. The fluid then expands approximately adiabatically in this motor, in producing work, which can be recovered and utilized to drive the said pump 11. During that expansion the temperature of the fluid drops correlatively. The fluid leaving the motor 20 at 73 passes on to the plug as at e by means of a pipe 179. It leaves the plug to pass through a pipe 180 leading it to the fluid reheater 19 or heat absorber. In passing through this reheater, the fluid which is then at a lower temperature than that in which the reheater is placed (the atmosphere in the case of a railway carriage or truck), absorbs heat from the ambient medium at an approximately isobar regime. In the case of stationary structures, the coil 19 may be immersed in running water, in a lake, etc. The working fluid issuing from the reheater 19 then passes successively through the following parts: a pipe 181, a pipe 182, the plug 23 as at f, a pipe 183, a pipe 184, the heat exchanger 21, a pipe 185, a pipe 186, the plug as at a from which the fluid issues into a pipe 187 which leads the fluid back to 70.

Then the cycle of the working fluid recommences.

While the working fluid describes its cycle, the fans 33 and 34 circulate ventilating air into the chambers or compartments 15, 16 or 17. The fan 33 takes air from the outside atmosphere through the inlet 188, provided at one end of the heat exchanger 22. The air, thus sucked in, passes through the heat exchanger 22, to reach, at its other end, the inlet of the pipe 189 through which it flows to the plug as at g from whence it emerges via a pipe 190 to the fan 33 and flows from there to a pipe 191, at which point it is distributed to the three air inlets 27, 28 and 29 via the pipes 191', 192 and 193 respectively.

The fan 34 draws the vitiated air from the chambers or compartments 15, 16 and 17 through the funnels 30, 31 and 32. The air thus drawn is delivered to the fan 34 by the pipe 194. The fan 34 forces this air into a pipe 195 from whence it then passes through the plug as at h to a pipe 196 leading it to the heat exchanger 21 at the end opposed to its outlet 197 from where this air escapes into the atmosphere.

It will be noted, that the air, at the surrounding temperature sucked in at 188, circulates in the exchanger 22 in counter-current flow to the working fluid. It thus abstracts heat from the working fluid, before the latter expands in the motor 20, so that this air arrives at the openings 27, 28 and 29 at a temperature higher than that of the outside air. When it emerges from these openings the air of aeration circulates in counter-current flow to the working fluid flowing through the radiators 12, 13 and 14, so that it is further heated. It is this aeration-air that is thus twice heated that penetrates into the chambers or compartments 15, 16 and 17.

The vitiated air withdrawn at 30, 31 and 32 is at a higher temperature than that of the outside atmosphere, so that when it subsequently passes into the exchanger 21 in counter-current flow to that of the working fluid, it gives up heat to the working fluid when the latter is at its lowest temperature immediately before it is to be intaken by the pump 11 to be compressed there.

This circulation of the air of aeration of the places to be heated, in counter-current flow through the exchangers 21 and 22 causes, apart from other heating of the air sent into these places, a heating of the working fluid while the latter is at a low temperature prior to its compression, and also a cooling of this working fluid before its expansion. This is an important feature of the invention because it is possible to show that the mechanical efficiency of the cycle is improved by using the greatest possible differences of volume. This heating prior to the compression of the working fluid, and its cooling after expansion have precisely the effect to fulfill this condition by an exchange of heat between the working fluid and the medium surrounding the place to be heated.

It is possible to decrease the degree of heating in the chambers 15, 16 and 17 by bleeding a part of the working fluid off across the by-pass 198, so that a smaller quantity of this fluid passes through the radiators 12, 13, 14 per unit of time.

This bleeding is effected by turning the plug cock 35 anti-clockwise (as seen in Figure 1) in order to partially cover the entry to the pipe 166 and at the same time progressively to uncover the entry to the by-pass 198 while at the same time leaving the outlet of the pipe 165 full open.

If the pressure at the intake side of the pump 11 deviates from the desired value for which the bolt 115 (Figure 8) has been set, the commutator switch 122 acts automatically, as previously explained, in order thereby to cause the motor 141 to start up and to drive the auxiliary pump 25 in order to increase or decrease the pressure in intake pipe 70 and thus re-establish the desired pressure there.

If the pressure at the discharge side of the main pump 11 deviates from the value corresponding to the actual adjustment of the bolt 115' (Figure 9) the commutator switch 122 acts automatically, as previously explained, and causes thereby, by means of the motor 143 the worm 102 and the worm wheel 101, a variation of the degree of advance of the admission valves such that the proper re-establishment of a suitable pressure in discharge pipe 71 automatically ensues.

Let it be assumed that, the apparatus functioning normally, the index 136 (Figure 10) is moved over a temperature (on the scale 157) above the medium in which the thermostat device 144 is placed, and which corresponds to the position of the hand 162 on the scale 163. This means that the apparatus must supply more heat. In order to obtain this additional heating, it suffices to increase the difference between the intake and discharge pressures of the main pump. In the arrangement shown, this increase is effected by acting on the discharge pressure only in the following manner. Since the temperature at thermostat 144 is less than the desired temperature (that is to say than that corresponding to the position of the index 156) the brush 159 is on one of the contacts 147 in contact with the segment 152. Consequently the relay 131 is energized as hereinbefore explained, whereby the bolt 115' is displaced thus shifting the adjustment of the manometric device 107 towards a higher pressure.

If the rod 111' were in the position shown in Figure 10 before the displacement of the nut 115', then while bolt 115' is being unscrewed rod 111' undergoes a displacement in a direction which causes the closing of the contacts 127' and 128' by the commutator switch 122'. The result is that the electric motor 143 starts to rotate and causes the worm wheel 101 to be displaced in a direction corresponding to an advance in the admission valves of the pump 11, as previously mentioned. This advance in the opening of the valves causes a tendency to increase the pressure in discharge pipe 71, which brings about the desired increase of the difference between the discharge and the intake pressures of the pump. Once the new higher discharge pressure is attained, the commutator switch 122' returns and automatically to the position shown, at which the motor 143 stops. The consequence of this increase in pressure is an increase in the heating produced by the apparatus so that the thermostat device 144 indicates an increase of temperature, which causes the brush 159 to move in a clockwise direction as seen in Figure 10. When the brush 159 arrives at such position that the hand 162 is opposite a value (on the scale 163) which is substantially equal to the value (on the scale 157) indicated by the index 156 at the time, the brush 159 will then be in contact with one of the contacts 147 that is not touched by the segment 152. From that instant onward the relay 131 comes to rest as previously explained, thus stopping the motor 129. This stopping of the motor 129 also immobilizes the bolt 115'.

When, by reason of the advance of the admission, the pressure in discharge pipe 71 has attained a value corresponding to the position in which the bolt 115' stopped, the commutator switch 122' opens and the motor 143 stops. From that moment onward the variations in temperature, which can be detected by the thermostat element 144, cause the relay 131 to act automatically if it concerns a lowering of temperature, or the relay 132 if it concerns an increase of temperature. Thus, the adjustment of the manometric device 107 may be automatically modified to bring about a variation of the discharge pressure in pipe 71 in a direction corresponding to a correction of the difference of temperature in question. This modification of the adjustment of the device 107 causes the motor 143 to start in a direction corresponding to a variation of the admission, by displacement of the cams in the corresponding direction. If the thermostat 144 detect a drop of temperature, the admission will be advanced in such manner as to re-establish the desired temperature. If, on the contrary, it detect an increase of temperature, the admission will be retarded.

It will be understood therefore that the regulating arrangement according to Figure 10 permits at any time during the working of the apparatus, predetermining the temperature it is desired to have in the place where the thermostat device 144 is located, and automatically obtaining the necessary modifications of the regulation necessary to effect and maintain this temperature.

*Operation when used for cooling*

The arrows indicated in Figure 1 in dotted lines clearly indicate the direction of the circulation when it is desired to effect cooling.

The working fluid arriving at intake pipe 70 at a pressure of 25 to 50 kg./cm.$^2$ or more, is compressed by the main pump 11 to say double that pressure or more. This compression, approximately adiabatic, raises the temperature of the working fluid. At the pump delivery at 71, the working fluid passes successively through the following parts: the pipe 164, the plug passage b, a pipe 202, the pipe 181, the heat exchanger 19, which in this case acts as a radiator. By reason of the passage of the fluid through this radiator, the working fluid is subjected to a drop in temperature approximately according to the isobar regime. The fluid leaving the radiator 19 flows successively through the pipe 180, a pipe 203, the plug way c (Figures 1 and 2), a pipe 204, a pipe 176, the heat exchanger 22, the pipe 175, a pipe 205, the plug way d and the pipe 178, which leads it at 72 to the working fluid motor 20. In this motor the fluid expands approximately adiabatically, giving out mechanical work which is recovered and serves partially to drive the main pump 11. The fluid leaves the motor at 73 at a low temperature and reaches the pipe 179 which leads it to the plug way e whence it leaves by the pipe 206 to pass then successively through the pipe 165, the plug cock 35 and the pipe 166, from where it flows to the three heat exchangers 12, 13 and 14, through the pipes 167, 168 and 169 respectively. These heat exchangers act then as reheaters of the fluid in absorbing heat from the chambers 15, 16 and 17 which are thus cooled. The working fluid leaves these reheaters 12, 13, 14 by means of the pipes 170, 171 and 172 respectively, and then arrives in a pipe 173 to pass then successively through a pipe 207, the plug way f, a pipe 208, the pipe 185, the heat exchanger 21, the pipe 184, a pipe 209, the plug way a and the pipe 187, thus returning the fluid to 70 to recommence the cycle.

While the working fluid describes this cycle, the fans 33 and 34 circulate the air required for aeration. The fan 33 draws in fresh air from the outside atmosphere through the mouth 197 of the heat exchanger 21.

This fresh air flows successively through the pipe 196, through the plug way h into a pipe 210, into the pipe 190 leading to the fan 33, from which it is forced into the pipe 191 thus reaching the mouths 27, 28 and 29, via the pipes 191', 192 and 193 respectively.

The fan 34 sucks the vitiated air out of the chambers or compartments 15, 16 and 17 through the funnels 30, 31 and 32. The air thus withdrawn is led to the fan 34 by the pipe 194. After having passed through this fan, the air is forced successively through the following parts: the pipe 195, a pipe 211, the plug way g, the pipe 189 and the heat exchanger 22 through the opening 188 of which it escapes into the atmosphere.

It will be observed that the air at the surrounding temperature, drawn in at 197, circulates in the heat exchanger 21 in counter-current flow relatively to the working fluid. It therefore gives up heat to that fluid, so that the air arrives at the openings 27, 28 and 29 at a lower temperature than that of the outside air. When leaving these openings this air circulates in counter-current flow relatively to the flow of the working fluid passing through the reheaters 12, 13 and 14, so that it continues to cool down. In this manner cool, fresh air is circulated into the chambers or compartments 15, 16 and 17.

The vitiated air withdrawn at 30, 31 and 32 is at a temperature intermediate between that of the external atmosphere and that of the working fluid arriving at the reheaters 12, 13 and 14 as it leaves the motor 20, so that when the vitiated air subsequently passes into the exchanger 22 in counter-current flow in respect to the working fluid it withdraws heat from the fluid flowing to the motor before being itself expelled into the atmosphere.

This circulation of ventilating air at the places to be cooled, in counter-current flow through the exchangers 21 and 22 has the effect of producing, beside a pre-cooling of the air delivered into these places, a re-heating of the working fluid before its compression, as well as a cooling of this working fluid before its expansion. The same advantages are therefore obtained in the case of cooling as have already been mentioned in the case of heating, viz: an increase of the difference between the extreme specific volumes of the fluid in the course of its cycle.

The degree of cooling in the chambers 15, 16 and 17 can be diminished by bleeding a part of the working fluid off through the by-pass pipe 198, by the cock 35, so that a lesser quantity of this fluid passes through the reheaters 12, 13 and 14 per unit of time.

If the pressure on the intake side of the main pump 11 varies from the fixed value, the desired pressure will be automatically re-established in the same manner as in the case of heating, by means of manometric device 106 and the auxiliary pump 25.

If the pressure on the discharge side of the main pump 11 deviates from the value corresponding to actual adjustment of the bolt 115', the proper pressure will be automatically re-established by a variation of the admission under the control of the manometric device 107.

If, when the apparatus be working normally, the index 156 (Figure 10) is displaced opposite to a temperature indication on the scale 157, different to the temperature shown by the thermostat device 144, which is indicated by the position of the pointer 162 on the scale 163, then there will follow an automatic variation in a similar manner as described in the case of heating, of the difference between the extreme pressures of the cycle in the sense corresponding to an increase or decrease of the cooling, according as to whether the temperature at 144 shall drop or rise. Once the desired temperature is thus obtained, it is automatically maintained in the same manner as previously described in the case of heating.

If it be assumed, for instance, that it is desired to obtain at 144 a higher temperature than that obtaining, that is to say, if it be necessary to reduce the cooling, then the handle 155 is turned clockwise to the extent desired. There automatically follows the energization of the relay 131, the starting up of the motor 129, a variation of the adjustment of the manometric device 107 follows in the sense of a decrease of the difference of pressure. This modification of the regulation causes the motor 143 to start up in the sense of retarding the admission which tends to lower the pressure in pipe 71. Once the pressure at 71 has dropped, the temperature at 144 increases and the pointer 162 tends to move to the position corresponding to the desired temperature. Once this position is attained, the relay 131 is de-energized, and the motor 129 stops. When the desired pressure at 71 is thus attained, the motor 143 stops in its turn and, from that moment onward, the desired temperature will be automatically maintained at 144 in a similar manner as has previously been described in the case of heating.

In case of unduly high pressure, the automatic safety valve 212 (Figure 1), comes into action and allows the working fluid to escape, either into the atmosphere, or into a reservoir connected to the auxiliary pump 25 at 26.

It is of the very greatest importance, in the case of an installation for the production of heat or cold according to the principle of the thermo-pump, to have as high a mechanical efficiency as possible of the machines used in the apparatus. It is for this reason that a reciprocating pump and a motor with pistons using a compressed fluid have been used in the embodiment described, because, it is only with this type of machine that it is possible to obtain very high mechanical efficiencies.

In order to reduce the losses, it is preferable to provide needle bearings for the connecting rods.

In the case where the intake and discharge pressures used are of the order of 50 and 80 kg./cm.$^2$ (approximately 711 and 1138 lbs. per sq. in.), respectively, the piston rings will work at a difference of pressure of 30 atm. which is of the same order as those maximum pressures used in explosion motors. It would therefore be possible to use ordinary piston rings. If it be desired to use extremely high pressures, for example, 100 and 160 kg./cm.$^2$ (approximately 1422 and 2275 lbs. per sq. in.), respectively, it would then be of advantage to provide on the exterior face of the piston a fluid at the medium pressure, say 130 kg./cm.$^2$ (approximately 1850 lbs. per sq. in.) so as not to increase the difference of pressure under which the piston rings work. In this case, the circuit of the working fluid would no longer pass through the gear box or boxes of the main pump and of the reciprocating motor. For still higher pressures between the two faces of the piston, care would have to be taken to use a solution which, while making sure of an effective fluid tightness, does not lead to exaggerated losses by reason of too great friction. It would then be preferable, instead of ordinary piston rings, to use packings of the type described in the French Patent No. 632,537 of the 9th of April, 1927. The same kind of fittings may also be employed with advantage to ensure fluid tightness to the different stages of the multiple way plug cock 23 and the cock 35.

The packing in question consists, in general, of one or several sheets of a substance such as a photographic or cinematographic film, of non-tanned veal hide or of some other suitable animal hide, vegetable parchment, or similar substance other than metal or leather, of a flexible but yet stiff nature, the said packing, when it is in working position and is composed of a plurality of cells, presenting a hollowed out central and conical part, directed in the direction in which the gas or the liquid exerts its high pressure.

The arrangements indicated, wherein the members ensuring fluid tightness of the pistons are only subjected to the difference or half the difference between the low and the high pressure of the cycle, cooperate to minimize the mechanical efforts, and correlatively the frictions which depend on the former are thus reduced and the efficiency improved.

It is obvious, that instead of combining the main pump and the compressed fluid motor into a single unit, it would be possible to provide a pump and a reciprocating motor quite distinct and apart from one another.

The springs of the valves provided are made as weak as the necessity of inertia permit, in order that:

1. The loss of energy from the fluid during its passage through the cylinders of the pump may be as small as possible.

2. In case of an unduly high pressure arising in the motor (caused, for example, by improper regulation of the admission and exhaust valves), the forcing back of the fluid will take place against a weak back pressure, that is to say, with as small a loss of energy as possible, the same thing happening in the case of the partial vacuum during the suction.

In order to reduce the losses, it would be possible to use for the pump, in the example just described as well as in the modification which has just been indicated, not automatic valves of admission and compression, but valves controlled and actuated in an exactly similar fashion to that indicated for the motor. In this case the regulation of the pressures could still be effected as described, or, on the contrary, it could be effected by acting on the distribution of the pump, without acting on that of the motor, or even in acting simultaneously on both in the opposite sense.

The connecting rods could be different to those shown in the drawings. They might in particular be similar to those described in the French Patent No. 437,491 of the 12th of December, 1911. According to this patent, there is provided at the extremity of the connecting rod a spherical supporting surface having the aspect of a parallelogram, limited by four lateral faces two and two in parallel, of which two are in the planes perpendicular to the axis of the crank pin, and the two others oblique, a guiding member being placed above the contact surface also presenting four lateral faces, two and two in parallel, of which two also have their plane perpendicular to the axis of the crank pin the other two being oblique in a sense different to the oblique phases of the supporting surface. In this design a ring or annular member of contact with spherical surface is provided, upon which the different connecting rod feet which are maintained on this annular member by lateral cheeks with ledges rest, against which ledges the lateral supporting faces on the contact surface of the connecting rods which form the guide member rests, in order to form reaction couples opposed to the rotation of the connecting rod around its shaft.

In practice it will be of advantage to provide means known per se to remove automatically by scraping any hoar frost that might form on the reheating member for the fluid 19, in the case of heating. In the case of cooling or refrigerating, care must be taken, that the heat exchangers 12, 13 and 14, which then function as fluid reheaters do not fall below a temperature of 0° C., so as to avoid the formation of frost. This can be effected, either by means of a thermometer with electric contact, acting in a manner known per se on a valve such as the valve 212, in order to cause the high pressure to drop and consequently reduce the cooling effect, when the low temperature of the working fluid drops below a minimum previously fixed, or in limiting the path of the handle 155 (Figure 10) on the side of the low temperatures.

The reheaters 12, 13 and 14 will be arranged preferably in such manner as to permit any condensate of water forming thereon to drain off.

In the example described the regulation of the heating and the cooling is effected by only varying the discharge pressure of the main pump in such manner as to increase or decrease the difference between the extreme pressures of the cycle, and consequently the ratio of these pressures. It is evidently possible to act in a similar manner as regards the intake pressure only, or to vary the intake and discharge pressures of the cycle simultaneously.

Instead of using air it would be possible to use other gases especially a monoatomic gas. The monoatomic gases have the remarkable advantage, that they permit of a substantial reduction of the compression ratios. It must moreover be pointed out here, that it will be advantageous, with the apparatus described, to work with high pressures but with moderate compression ratios.

The high pressure of the cycle through which the working fluid is made to pass is preferably comprised, in case a gaseous fluid is concerned, between 35 and several hundreds of kg./cm.$^2$. The ratio of high to low pressures to which the working gaseous fluid is subjected is preferably at the most equal to 3; it will be still more preferably of the order of from 2 to 2.5.

The ultra turbulent regime, of which mention has been made above, and which allows of increasing to a very great degree the rapidity of the exchange of heat between the working fluid and the walls, can be easily obtained by giving the wall in contact with the fluid a rough surface, by threading it for instance.

I claim:

1. The process of regulating the temperature of the air within an enclosed space, comprising maintaining a non-condensing gas in the crankcase of a compressor at a pressure not substantially lower than 20 kg./cm.$^2$, drawing gas from said crankcase into the cylinders of said compressor, compressing said gas in said cylinders to a pressure not substantially in excess of 2.5 times the pressure maintained in the crankcase, restraining the flow of heat from the gas in said cylinders by thermal insulation on the cylinder heads and pistons of said compressor, subjecting gas discharged from said cylinders to heat interchange to abstract heat therefrom, thereafter expanding said gas in a gas-expansion motor adapted to furnish a part of the power required to drive said compressor, subjecting gas expanded in said motor to heat interchange to supply heat thereto, and introducing air whose temperature is to be regulated into one of said heat interchangers.

2. The process of regulating the temperature of the air within an enclosed space, comprising maintaining non-condensing gas in the crankcase of a compressor at a pressure not substantially lower than 20 kg./cm.$^2$, drawing gas from said crankcase into the cylinders of said compressor, compressing said gas in said cylinders to a pressure approximately two and not substantially more than two and one-half times the pressure maintained in the crankcase, restraining the flow of heat from the gas in said cylinders by thermal insulation on the cylinder heads and pistons of said compressor, subjecting gas discharged from said cylinders to heat interchange to abstract heat therefrom, thereafter expanding said gas in a gas-expansion motor adapted to furnish a part of the power required to drive said compressor, subjecting gas expanded in said motor to heat interchange to supply heat thereto, returning said expanded gas to said crankcase and introducing air whose temperature is to be regulated into one of said heat interchangers.

3. The process of regulating the temperature of the air within an enclosed space, comprising maintaining a non-condensing gas in the crankcase of a compressor at a pressure not substantially lower than 20 kg./cm.² and approximately 25 kg./cm.², drawing gas from said crankcase into the cylinders of said compressor, compressing said gas in said cylinders to a pressure approximately two and not substantially more than two and one-half times the pressure maintained in the crankcase, restraining the flow of heat from the gas in said cylinders by thermal insulation on the cylinder heads and pistons of said compressor, subjecting gas discharged from said cylinders to heat interchange to abstract heat therefrom, thereafter expanding said gas in a gas-expansion motor adapted to furnish a part of the power required to drive said compressor, subjecting gas expanded in said motor to heat interchange to supply heat thereto, and introducing air whose temperature is to be regulated into one of said heat interchangers.

4. The process of regulating the temperature of the air within an enclosed space, comprising maintaining a non-condensing gas in the crankcase of a compressor at a pressure substantially higher than 20 kg./cm.², drawing gas from said crankcase into the cylinders of said compressor, compressing said gas in said cylinders to a pressure approximately two and not substantially more than two and one-half times the pressure maintained in the crankcase, restraining the flow of heat from the gas in said cylinders by thermal insulation on the cylinder heads and pistons of said compressor, subjecting gas discharged from said cylinders to heat interchange to abstract heat therefrom, thereafter expanding said gas in a gas-expansion motor adapted to furnish a part of the power required to drive said compressor, subjecting gas expanded in said motor to heat interchange to supply heat thereto, and introducing air whose temperature is to be regulated into one of said heat interchangers.

5. In apparatus for maintaining a desired temperature in the atmosphere of an enclosed space, in combination, a combined gas compressor and gas expansion motor having an even number of cylinders not less than six radially and equiangularly disposed about a crankcase, the cylinders being so arranged that alternate cylinders form part of the compressor and intervening cylinders form part of the motor, pistons with heat-insulated heads mounted in said cylinders and connected to a common crank, means for conducting a non-condensing gas in a cyclic path including in the order stated the compressor, a first heat interchanger, the motor, and a second heat interchanger, and means for passing a current of the air whose temperature is to be maintained through one of said heat interchangers and to discharge the same therefrom into the atmosphere of the enclosed space.

6. In apparatus for maintaining a desired temperature in the atmosphere of an enclosed space, in combination, a combined gas compressor and gas expansion motor having an even number of cylinders not less than six radially and equiangularly disposed about a crankcase, the cylinders being so arranged that alternate cylinders form part of the compressor and intervening cylinders form part of the motor, pistons with heat-insulated heads mounted in said cylinders and connected to a common crank, means including spring-held valves positioned in the heads of the pistons mounted in the compressor cylinders for conducting a non-condensing gas in a cyclic path including in the order stated the compressor, a first heat interchanger, the motor, and a second heat interchanger, and means for passing a current of the air whose temperature is to be maintained through one of said heat interchangers and to discharge the same therefrom into the atmosphere of the enclosed space.

7. In apparatus for maintaining a desired temperature in the atmosphere of an enclosed space, in combination, a reciprocating gas compressor and a reciprocating gas expansion motor, each having pistons and cranks connected to a common crankshaft, an enclosed crankcase for said crankshaft, means for conducting a non-condensing gas in a cyclic path including in the order stated said enclosed crankcase, the cylinders of said compressor, a first heat interchanger, the cylinders of said motor and a second heat interchanger, means to maintain the compressible gas in said crankcase at a desired superatmospheric pressure, and means for passing a current of the air whose temperature is to be maintained through one of said heat interchangers and to discharge the same therefrom into the atmosphere of the enclosed space.

8. In apparatus for controlling the temperature of an enclosed space, in combination, a multi-cylinder gas compressor and a multi-cylinder gas expansion motor, their cylinders having pistons connected with a common crank-shaft, means for conducting a non-condensing gas in a circuit including said compressor and said motor, valves governing admission of the fluid to and its exhaust from the cylinders of said compressor and motor, a valve-actuating cam for opening and closing at least one of said valves in timed relation to the movement of the piston in one of said cylinders, and automatic means mutually responsive to change in the pressure of the gas at one point in its circuit and to change in the temperature of said enclosed space for varying the time relation between the operation of said valve-actuating cam and the movement of said piston.

9. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing at least one of said valves in timed relation to the movement of the piston in one of said cylinders, and automatic means responsive to change in the pressure of the gas at one point in its circuit for varying the time relation between the operation of said valve-actuating cam and the movement of said piston.

10. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, valve-actuating cams for opening and closing at least one of the valves associated with each of said motor cylinders in timed relation to the movement of the pistons in said cylinders respectively, and automatic means responsive to change in the pressure of the gas at one point in its circuit for varying the time relation between the operation of said valve-actuating cams and the movement of said pistons.

11. In apparatus for maintaining a desired temperature in the atmosphere of an enclosed space, in combination, a combined reciprocating gas compressor and reciprocating gas expansion motor having an even number of cylinders not less than six radially and equi-angularly disposed about an enclosed crankcase, alternate cylinders serving as the compressor and intervening cylinders serving as the motor, means for conducting a non-condensing gas in a cyclic path including in the order stated said enclosed crankcase, the cylinders of said compressor, a first heat interchanger, the cylinders of said motor and a second heat interchanger, valves governing admission of the fluid to and its exhaust from the cylinders of said compressor and motor, a valve-actuating cam for opening and closing at least one of said valves in timed relation to the movement of the piston in one of said cylinders, and means mutually responsive to change in the pressure of the gas at one point in its path and to change in the temperature of said enclosed space for varying the time relation between the operation of said valve-actuating cams and the movement of said piston.

12. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing at least one of said valves in timed relation to the movement of the piston in one of said cylinders, means responsive to change in the temperature of said enclosed space for varying the time relation between the operation of said valve-actuating cam and the movement of said piston, and pump means responsive to reduction in the pressure of gas in said circuit to introduce fresh supplies of gas into said circuit.

13. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing at least one of said valves in timed relation to the movement of the piston in one of said cylinders, means responsive to change in the temperature of said enclosed space for varying the time relation between the operation of said valve-actuating cam and the movement of said piston, and reversible pump means responsive to change in the pressure of gas in said circuit to introduce fresh supplies of gas thereto and to bleed excess gas therefrom according as the pressure falls below or exceeds a desired pressure.

14. In apparatus for controlling the temperature of an enclosed space by means of a confined gas which is compressed and expanded to effect heat transfer, in combination, a cylinder, a piston working therein, a valve adapted to control the flow of fluid medium between said cylinder and a conduit connected therewith, a valve-actuating cam adapted to open and close said valve in timed relation to the movement of the piston in said cylinder, and means automatically responsive to change in the pressure of said confined gas for varying the time relation between the operation of said valve-actuating cam and the movement of said piston.

15. In apparatus for controlling the temperature of the air within an enclosed space, in combination, a gas compressor and a gas-expansion motor both operating on a common crankshaft, conduits for conducting gas at an elevated pressure from the compressor to a first heat interchanger, then from said first heat interchanger to the motor, then at a less elevated pressure from the motor to a second heat interchanger, and then from said second heat interchanger to the compressor, at least one of said heat interchangers being arranged to exchange heat between the said gas and a fresh supply of air passing to the enclosed space, valves for directing the flow of gas and of fresh air respectively to said heat interchangers, and common manually-operable means for simultaneously manipulating said valves to reverse the direction of flow of gas through the interchangers and to direct the flow of fresh air through one of said interchangers when it is desired to heat the enclosed space and through the other of said interchangers when it is desired to cool the same.

16. For use in transferring heat from one zone to another by means of non-condensing gas alternately and cyclically expanded to a pressure not substantially less than 20 kg./cm.$^2$ and compressed to a pressure approximately two to two and one-half times thereof in a closed circuit, in combination, a combined gas compressor and gas expansion motor having an even number not less than six cylinders, at least a part of the internal working surface of said cylinders being lined with heat-insulating material, said cylinders being radially and equi-angularly disposed about a common crankshaft within an enclosed crankcase, alternate cylinders serving as the compressor for compressing gas in said circuit and intervening cylinders serving as the motor wherein gas in said circuit is expanded, means to admit gas into said crankcase at substantially the lowest pressure prevailing in the circuit, spring-held valves in the heads of the pistons operating in the compressor cylinders adapted to govern the flow of gas from said crankcase to said cylinders, and a facing of heat insulating material secured to the working face of said pistons affording openings therein for the passage of gas under control of said valves.

17. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing at least one of said valves in timed relation to the movement of the piston in one of said cylinders, and reversible pump means responsive to change in the pressure of gas in said circuit to introduce fresh supplies of gas thereto and to bleed excess gas therefrom according as the pressure falls below or exceeds a desired pressure.

18. In apparatus for controlling the temperature of the air within an enclosed space, in combination, a gas compressor and a gas-expansion motor both operating on a common crankshaft, conduits for conducting gas at an elevated pressure from the compressor to a first heat interchanger, then from said first heat interchanger to the motor, then at a less elevated pressure from the motor to a second heat interchanger, and then from said second heat interchanger to the compressor, at least one of said heat interchangers being arranged to exchange heat between the said gas and a current of the air whose temperature is to be controlled, valves for directing the flow of gas and of said current of air respectively to said heat interchangers, and common manually-operable means for simultaneously manipulating said valves to reverse the direction of flow of gas through the interchangers and to direct the flow of said current of air through one of said interchangers when it is desired to heat the enclosed space and through the other of said interchangers when it is desired to cool the same.

19. In apparatus for heating or cooling the temperature of the air within an enclosed space, the combination of a closed gas circuit including a compressor and an expansion motor mechanically connected together, four heat interchangers of which the principal one is positioned within the enclosed space, and manually-operable valve means for directing the flow of gas in said circuit and of fresh ventilating air for said space in such manner that when it is desired to heat the said space gas from the compressor passes first to said principal heat interchanger and then to a second interchanger before reaching the motor, and when it is desired to cool said space gas from the motor passes first to said principal interchanger and then to a third interchanger before reaching the compressor, the return in each case including the fourth interchanger.

20. In apparatus for controlling the temperature of an enclosed space, in combination, a multicylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing at least one of said valves in timed relation to the movement of the piston in one of said cylinders, means responsive to change in the temperature of said enclosed space for varying the time relation between the operation of said valve-actuating cam and the movement of said piston, and means responsive to changes of gas pressure in said circuit to maintain the pressure on the intake side of said compressor at a predetermined pressure.

21. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing and said valves in timed relation to the movement of the piston in one of said cylinders, means responsive to change in the temperature of said enclosed space for varying the time relation between the operation of said valve-actuating cam and the movement of said piston, and a reversible pump intercommunicating with the gas circuit adjacent the intake side of said compressor and with an outside source of gas, and means responsive to variation, from a predetermined pressure, of the pressure of said gas at the intake side of said compressor to cause said pump to deliver gas between said circuit and said source in a direction tending to restore said pressure to the predetermined value.

22. In apparatus for controlling the temperature of an enclosed space, in combination, a multi-cylinder gas compressor and a multi-cylinder gas expansion motor, their cylinders having pistons connected with a common crankshaft, means for conducting a non-condensing gas in a circuit including said compressor and said motor, valves governing admission of the gas to and its exhaust from the cylinders of said compressor and motor, a valve-actuating cam for opening and closing at least one of said valves in timed relation to the movement of the piston in one of said cylinders, means responsive to change in the temperature of said enclosed space for varying the time relation between the operation of said valve-actuating cam and the movement of said piston, said means including a thermostat, a manually-settable temperature selector associated therewith, mechanism responsive to variations in pressure at the discharge side of said compressor for advancing and retarding said cam, and mechanism interposed between said selector and said mechanism whereby the latter is moved to advance or retard said cams in response to a difference between the actual temperature recorded by said thermostat and the desired temperature established by the setting of said selector.

23. In apparatus for maintaining a desired temperature in the atmosphere of an enclosed space, in combination, a combined gas compressor and gas expansion motor having an even number of cylinders not less than six radially and equi-angularly disposed about a crankcase, the cylinders being so arranged that alternate cylinders form part of the compressor and intervening cylinders form part of the motor, pistons mounted in said cylinders and connected to a common crank, means for conducting a non-condensing gas in a cyclic path including in the order stated the compressor, a first heat interchanger, the motor, and a second heat interchanger, means for passing a current of the air whose temperature is to be maintained through one of said heat interchangers and to discharge the same therefrom into the atmosphere of the enclosed space, and means associated with one of said heat interchangers to prevent the temperature therein falling below the freezing point.

ROBERT ESNAULT-PELTERIE.